US009634782B2

(12) United States Patent
Suzuki

(10) Patent No.: US 9,634,782 B2
(45) Date of Patent: Apr. 25, 2017

(54) CLOCK SYNCHRONIZATION SYSTEM, CLOCK SYNCHRONIZATION METHOD, AND STORAGE MEDIUM WHEREUPON CLOCK SYNCHRONIZATION PROGRAM IS STORED

(71) Applicant: Seitarou Suzuki, Tokyo (JP)

(72) Inventor: Seitarou Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 41 days.

(21) Appl. No.: 14/405,981

(22) PCT Filed: Dec. 27, 2012

(86) PCT No.: PCT/JP2012/008412
§ 371 (c)(1),
(2) Date: Dec. 5, 2014

(87) PCT Pub. No.: WO2013/190602
PCT Pub. Date: Dec. 27, 2013

(65) Prior Publication Data
US 2015/0124844 A1    May 7, 2015

(30) Foreign Application Priority Data
Jun. 19, 2012   (JP) .................. 2012-137859

(51) Int. Cl.
*H04J 3/06* (2006.01)
*H04W 56/00* (2009.01)

(52) U.S. Cl.
CPC .......... *H04J 3/0682* (2013.01); *H04J 3/0667* (2013.01); *H04W 56/0015* (2013.01)

(58) Field of Classification Search
None
See application file for complete search history.

(56) References Cited

U.S. PATENT DOCUMENTS

| 8,949,648 B2* | 2/2015 | Peng ..................... H04J 3/0673 713/400 |
| 2002/0136198 A1* | 9/2002 | Findikli ................ H04J 3/0685 370/350 |

(Continued)

FOREIGN PATENT DOCUMENTS

| CN | 101385301 A | 3/2009 |
| JP | 2007-174680 | 7/2007 |

(Continued)

OTHER PUBLICATIONS

International Search Report corresponding to PCT/JP2012/008412 mailed Feb. 26, 2013 (3 pages).

(Continued)

*Primary Examiner* — Hassan Kizou
*Assistant Examiner* — Deepa Belur
(74) *Attorney, Agent, or Firm* — Wilmer Cutler Pickering Hale and Dorr LLP

(57) ABSTRACT

A slave node (104) includes N time regeneration units (105 to 107) each of which communicates with each of N master nodes (101 to 103) to compute a propagation delay between each master node (101 to 103) and the slave node (104) and regenerates a time of each master node (101 to 103), a time comparison unit (108) that independently computes each comparison result between the time of each master node (101 to 103), which is regenerated by each of N time regeneration units (105 to 107), and a reference time held by the slave node (104), and a reference time determination unit (109) that computes each correction value by carrying out weighting for each comparison result computed by the time comparison unit (108) based on the propagation delay and determines a reference time of the slave node (104) by carrying out statistical processing by using the correction value. With this configuration, it is possible to improve (Continued)

precision and accuracy of synchronization of the time of the slave node at low cost.

15 Claims, 6 Drawing Sheets

(56) References Cited

U.S. PATENT DOCUMENTS

| | | | |
|---|---|---|---|
| 2005/0207387 A1* | 9/2005 | Middleton | H04J 3/0664 370/347 |
| 2007/0189164 A1* | 8/2007 | Smith | H04L 69/28 370/230 |
| 2009/0225779 A1* | 9/2009 | Diab | H04J 3/0641 370/469 |
| 2010/0111113 A1* | 5/2010 | Wong | H04J 3/14 370/503 |
| 2010/0254225 A1 | 10/2010 | Schweitzer, III et al. | |
| 2011/0150008 A1* | 6/2011 | Le Pallec | H04L 41/5003 370/503 |
| 2013/0208735 A1* | 8/2013 | Mizrahi | H04J 3/0661 370/503 |
| 2016/0095075 A1* | 3/2016 | Bin Sediq | H04W 56/001 370/350 |

FOREIGN PATENT DOCUMENTS

| | | |
|---|---|---|
| JP | 2009-065579 A | 3/2009 |
| JP | 2009-089166 | 4/2009 |
| JP | 2011-135482 | 7/2011 |
| JP | 2012-023654 | 2/2012 |
| WO | WO-02/29529 A1 | 4/2002 |
| WO | WO-2008/142815 | 11/2008 |

OTHER PUBLICATIONS

Extended European Search Report corresponding to European Application No. 12879299.1, dated Dec. 2, 2015, 10 pages.

T. Murakami, et al. "A Master Redundancy Technique in IEEE 1588 Synchronization with a Link Congestion Estimation", 2010 International IEEE Symposium on, IEEE, Piscataway, NJ, USA, Sep. 27, 2010, pp. 30-35 (6 pages), XP 031780860.

Chinese Office Action issued by the State Intellectual Property Office of The People's Republic of China for Application No. 201280074139.X dated Sep. 26, 2016 (15 pages).

* cited by examiner

CLOCK SYNCHRONIZATION SYSTEM, CLOCK SYNCHRONIZATION METHOD, AND STORAGE MEDIUM WHEREUPON CLOCK SYNCHRONIZATION PROGRAM IS STORED

CROSS-REFERENCE TO RELATED APPLICATIONS

This application is a national stage application of International Application No. PCT/JP2012/008412 entitled "CLOCK SYNCHRONIZATION SYSTEM, CLOCK SYNCHRONIZATION METHOD, AND STORAGE MEDIUM WHEREUPON CLOCK SYNCHRONIZATION PROGRAM IS STORED" filed on Dec. 27, 2012, which claims priority to Japanese Application No. 2012-137859 filed on Jun. 19, 2012, the disclosures of which are hereby incorporated by reference in their entirety.

TECHNICAL FIELD

The present invention relates to a clock synchronization system, clock synchronization method, and clock synchronization program.

BACKGROUND ART

In recent years, systems which make a plurality of nodes existing in a network operate in a coordinated manner have been used. In such a network, it is important to synchronize times of a master node and a slave node with each other.

Synchronization of time between a plurality of nodes is carried out based on a clock synchronization protocol which uses Ethernet (registered trademark) frames and is defined in, for example, IEEE1588v2 or the like. However, when the clock synchronization protocol is used, precision of the time regenerated in a communication environment with large delay fluctuation may deteriorate. In addition, accuracy of the regenerated time may also deteriorate due to asymmetry of delays.

The Best Master Clock Algorithm, in which a node is selected to synchronize with by using Clock Quality or the like, which is communicated by a master node with Announce Message, is widely known. However, because the algorithm selects a node based on only precision and accuracy of a master node, influence from delay fluctuation and delay asymmetry on the network cannot be avoided.

In PTL 1, a clock synchronization system is disclosed which accomplishes clock synchronization between a master and a slave without using a boundary clock in a network including, in a portion thereof, asymmetric paths of forward and return transmission paths.

In PTL 2, a correction method is disclosed which corrects an inaccurate temporal synchronization which takes place due to an asymmetric delay in a communication link.

In PTL 3, a clock synchronization system is disclosed which, between a master node and a slave node, computes a difference between the times of the master node and the slave node based on a queuing delay which takes place on a communication message and synchronizes the time of the slave node with the time of the master node.

CITATION LIST

Patent Literature

[PTL 1]
Japanese Patent Application Laid-Open No. 2009-065579

[PTL 2]
Japanese Patent Application Laid-Open No. 2007-174680

[PTL 3]
Japanese Patent Application Laid-Open No. 2011-135482

SUMMARY OF INVENTION

Technical Problem

A method to correlate each information among a plurality of slave nodes as disclosed in PTL 1 and Transparent Clock (TC) defined in IEEE1588v2 are effective as a method to mitigate delay fluctuation and asymmetry in a network. However, there is a problem such that, to use these methods, it is necessary to implement an information communication function among a plurality of slave nodes and for all nodes to implement the TC function, and, thus, the cost may increase. Moreover, it is desired to further improve the precision and accuracy of the time of a slave node.

Solution to Problem

A clock synchronization system according to the present invention is a clock synchronization system to synchronize a time on a slave node based on time information received from a plurality of master nodes via a network, and the slave node communicates with a plurality of master nodes to compute a propagation delay between each master node and the slave node, and includes a time regeneration unit configured to regenerate a time of each master node, a time comparison unit configured to individually compute a comparison result between a time of each master node which the time regeneration unit regenerates individually and a reference time held by the slave node, and a reference time determination unit configured to compute a correction value for each comparison result by carrying out weighting for each comparison result computed by the time comparison unit based on a propagation delay computed by the time regeneration unit, and determine a reference time of the slave node by using each correction value.

A clock synchronization method according to the present invention is a clock synchronization method to carry out synchronization of a time on a slave node based on time information received from a plurality of master nodes via a network, in which the slave node regenerates a time of each master node, computes a comparison result between the individually regenerated time of each of the master nodes and a reference time held by the slave node, carries out weighting for each of the comparison results based on a propagation delay between each master node and the slave node to compute a correction value for each regenerated time, and determines a reference time of the slave node by using each correction value.

A clock synchronization program according to the present invention is a clock synchronization program which carries out synchronization of a time on a slave node based on time information received from a plurality of master nodes via a network, and the program acquires a regenerated time of each master node, acquires a propagation delay between each master node and the slave node, computes a comparison result between the acquired time of each master node and a reference time held by the slave node, computes a correction value by carrying out weighting for each comparison result based on the propagation delay, and determines a reference time of the slave node by using each correction value.

Advantageous Effects of Invention

It is possible to improve precision and accuracy of a slave node at low cost in carrying out synchronization of a time.

Description of Embodiments

First Exemplary Embodiment

Figure 1:
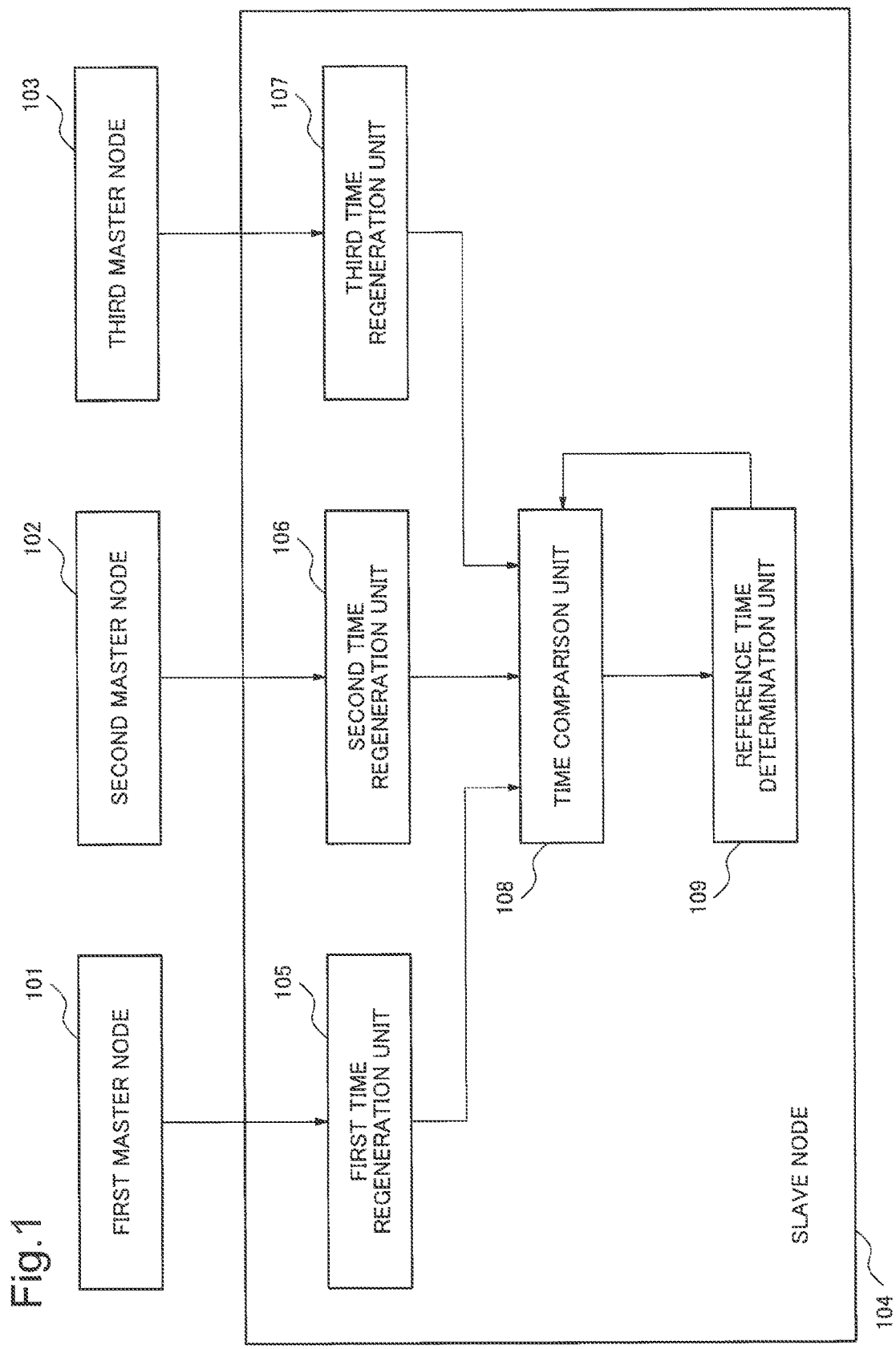
FIG. 1 is a block diagram illustrating a configuration of a clock synchronization system of a first exemplary embodiment.

An exemplary embodiment of the present invention will be described below with reference to the accompanying drawings. FIG. 1 is a block diagram illustrating a configuration of a clock synchronization system 10 according to the present invention.

The clock synchronization system 10 includes a first master node 101, a second master node 102, a third master node 103, and a slave node 104.

The first master node 101 is a topmost clock generation point which is located at a vertex of a master-slave synchronization network and generates a signal with a reference frequency in the network by itself. The first master node 101 outputs the signal with the reference frequency and protocol frames to a first time regeneration unit 105.

The second master node 102 is a topmost clock generation point which is located at a vertex of the master-slave synchronization network and generates a signal with the reference frequency in the network by itself. The second master node 102 outputs the signal with the reference frequency and protocol frames to a second time regeneration unit 106.

The third master node 103 is a topmost clock generation point which is located at a vertex of the master-slave synchronization network and generates a signal with the reference frequency in the network by itself. The third master node 103 outputs the signal with the reference frequency and protocol frames to a third time regeneration unit 107. It is assumed that each master node is synchronized with an identical synchronization source, e.g. Global Navigation Satellite System (GNSS).

Figure 2:
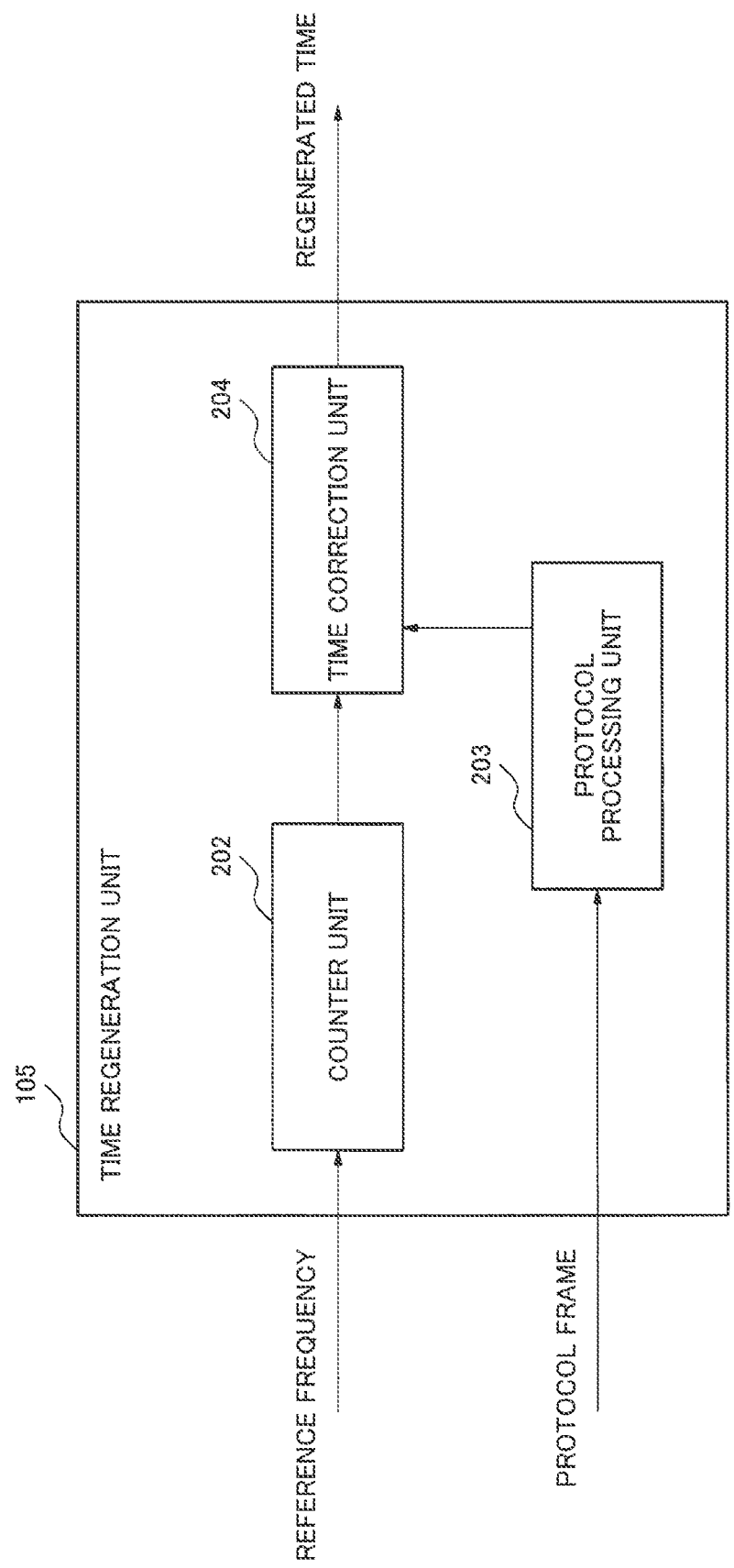
FIG. 2 is a diagram illustrating details of a time regeneration unit of the first exemplary embodiment.

The slave node 104 includes the first time regeneration unit 105, the second time regeneration unit 106, the third time regeneration unit 107, a time comparison unit 108, and a reference time determination unit 109. The first time regeneration unit 105 conforms to the IEEE1588v2 protocol and regenerates the time generated by the first master node 101. The first time regeneration unit 105 outputs information of the regenerated time to a time comparison unit 108. FIG. 2 is a diagram illustrating details of the first time regeneration unit 105. The first time regeneration unit 105 includes a counter unit 202, a protocol processing unit 203, and a time correction unit 204. The second time regeneration unit 106 and the third time regeneration unit 107, as with the first time regeneration unit 105, includes a counter unit 202, a protocol processing unit 203, and a time correction unit 204.

The counter unit 202 is a free-running counter which keeps counting up at timings in accordance with an after-mentioned reference frequency. The counter unit 202 outputs information of the counting to the time correction unit 204.

The protocol processing unit 203 carries out processing of the protocol frames received from a master node and computes a propagation delay and time difference between the master node and the slave node. The protocol processing unit 203 outputs a result of the processing of the protocol frames to the time correction unit 204. An operation of the protocol processing unit 203 will be described in detail later.

The time correction unit 204, in accordance with the result of the processing by the protocol processing unit 203, corrects the output from the counter unit 202. More specifically, based on the propagation delay and time difference computed by the protocol processing unit 203, the output of the counter unit 202 is corrected. The time correction unit 204 outputs a result of the correction to the time comparison unit 108.

The time comparison unit 108 computes results of comparison between the times, each of which is input from any of the first time regeneration unit 105, second time regeneration unit 106, and third time regeneration unit 107, and comparison of each of the times with a reference time of the slave node generated by a frequency regeneration unit 111. The time comparison unit 108 outputs the comparison results to a statistic unit 110.

Figure 3:
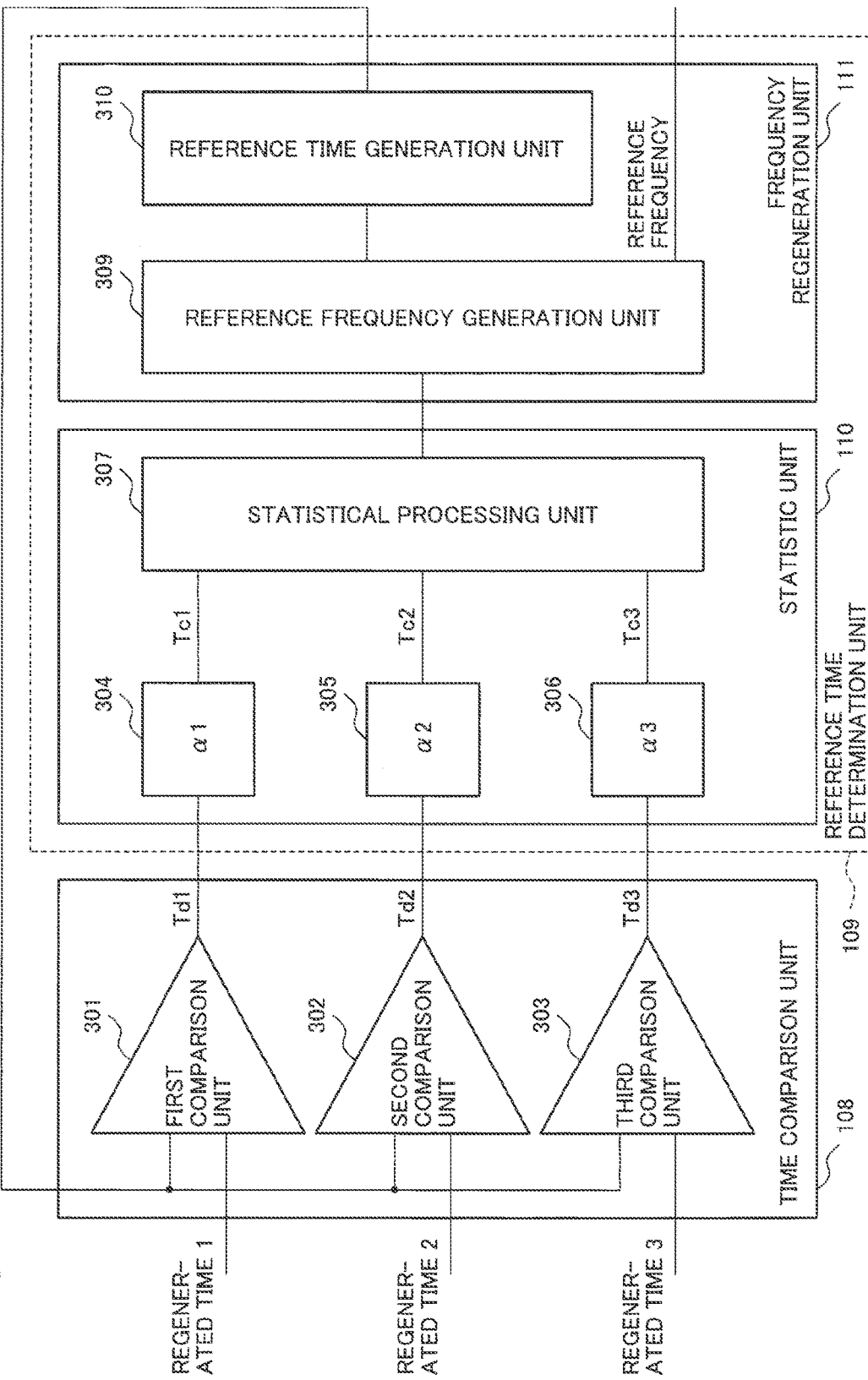
FIG. 3 is a diagram illustrating details of a time comparison unit, time correction unit, and frequency regeneration unit of the first exemplary embodiment.

The time comparison unit 108 and the reference time determination unit 109 constitute a PLL (Phase Locked Loopback) circuit. FIG. 3 is a diagram illustrating details of configurations of these units. The time comparison unit 108 includes a first comparison unit 301, a second comparison unit 302, and a third comparison unit 303.

The reference time determination unit 109 includes the statistic unit 110 and the frequency regeneration unit 111.

The statistic unit 110 carries out time correction based on the comparison results input from the time comparison unit 108. The statistic unit 110 outputs the result of the time correction to the frequency regeneration unit 111. More specifically, the statistic unit 110 includes a first correction unit ($\alpha 1$) 304, a second correction unit ($\alpha 2$) 305, a third correction unit ($\alpha 3$) 306, and a statistical processing unit 307.

The frequency regeneration unit 111 generates a signal with a reference frequency and outputs a reference time to the time comparison unit 108. More specifically, the frequency regeneration unit 111 includes a reference frequency generation unit 309 and a reference time generation unit 310.

The first comparison unit 301 compares the time output by the first time regeneration unit 105 with the reference time output by the reference time generation unit 310. The first comparison unit 301 outputs the comparison result Td1 to the first correction unit 304.

The second comparison unit 302 compares the time output by the second time regeneration unit 106 with the reference time output by the reference time generation unit 310. The second comparison unit 302 outputs the comparison result Td2 to the second correction unit 305.

The third comparison unit 303 compares the time output by the third time regeneration unit 107 with the reference time output by the reference time generation unit 310. The third comparison unit 303 outputs the comparison result Td3 to the third correction unit 306. The first comparison unit 301, the second comparison unit 302, and the third comparison unit 303 are independent from one another.

The first correction unit 304 carries out weighting for the comparison result Td1 input from the first comparison unit 301. The first correction unit 304 outputs a weighted comparison result Tc1 to the statistical processing unit 307.

The second correction unit 305 carries out weighting for the comparison result Td2 input from the second comparison unit 302. The second correction unit 305 outputs a weighted comparison result Tc2 to the statistical processing unit 307.

The third correction unit 306 carries out weighting for the comparison result Td3 input from the third comparison unit 303. The third correction unit 306 outputs a weighted comparison result Tc3 to the statistical processing unit 307. A method of weighting will be described with an example later.

The statistical processing unit 307 carries out statistical processing based on the comparison results Tc1, Tc2, and Tc3 input from the first correction unit 304, the second correction unit 305, and the third correction unit 306, respectively. With this processing, the statistical processing unit 307 determines a correction amount for the slave node 104. For example, the statistical processing unit 307 converts the determined correction amount to a voltage and outputs the voltage. A method of statistical processing by the statistical processing unit 307 will be described later in detail.

The reference frequency generation unit 309 generates a signal with a reference frequency. Typically, the reference frequency generation unit 309 is a voltage control oscillator (VCO), which is a circuit that can control frequency of an output signal based on an input voltage. In the following description, it is assumed that the reference frequency generation unit 309 is a VCO. The VCO 309 outputs the generated signal with the reference frequency to the reference time generation unit 310. Because the VCO is well known to those skilled in the art and does not have direct relevance to the scope of the present invention, a description of detailed configuration will be omitted.

The reference time generation unit 310, based on the signal with the reference frequency input from the VCO 309, generates the reference time. Because the configuration of the reference time generation unit 310 is well known to those skilled in the art, a description of configuration details will be omitted. The reference time generation unit 310 outputs the generated reference time to the first comparison unit 301, the second comparison unit 302, and the third comparison unit 303.

Figure 4:
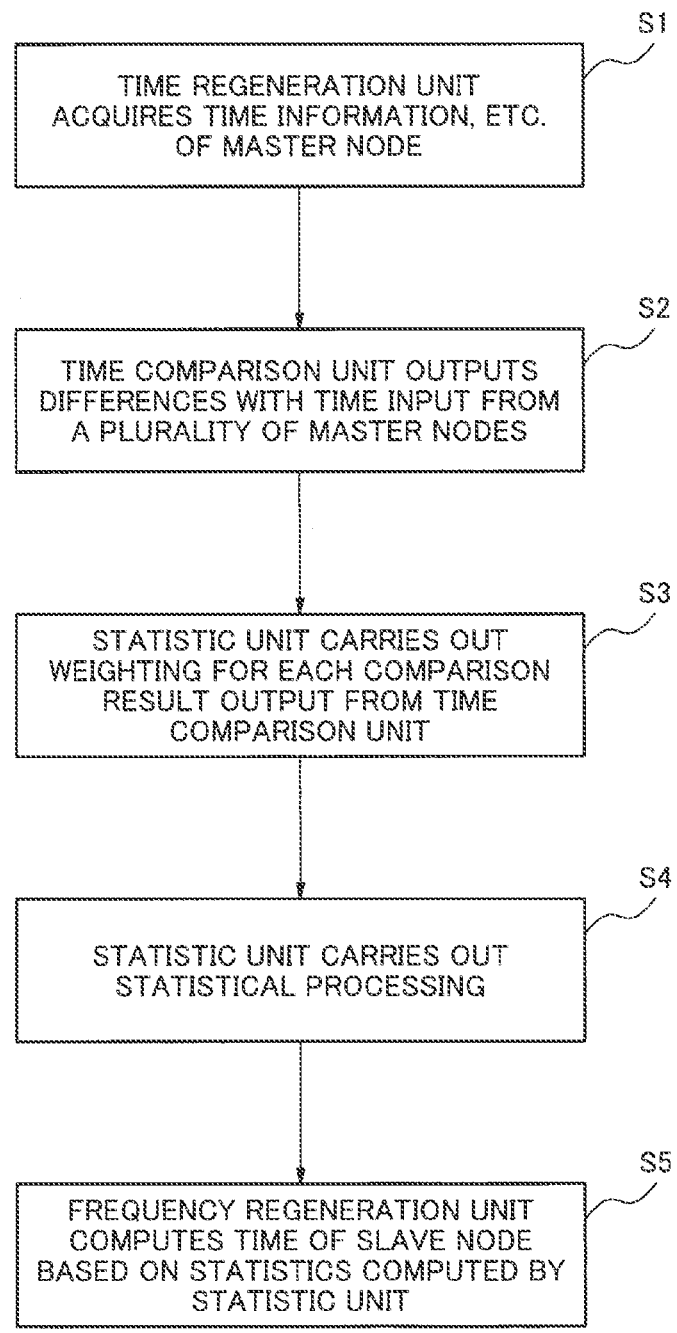
FIG. 4 is a flowchart illustrating an operation of the clock synchronization system of the first exemplary embodiment.

Next, detailed operation will be described below. FIG. 4 is a flowchart of an operation of the clock synchronization system.

Figure 5:
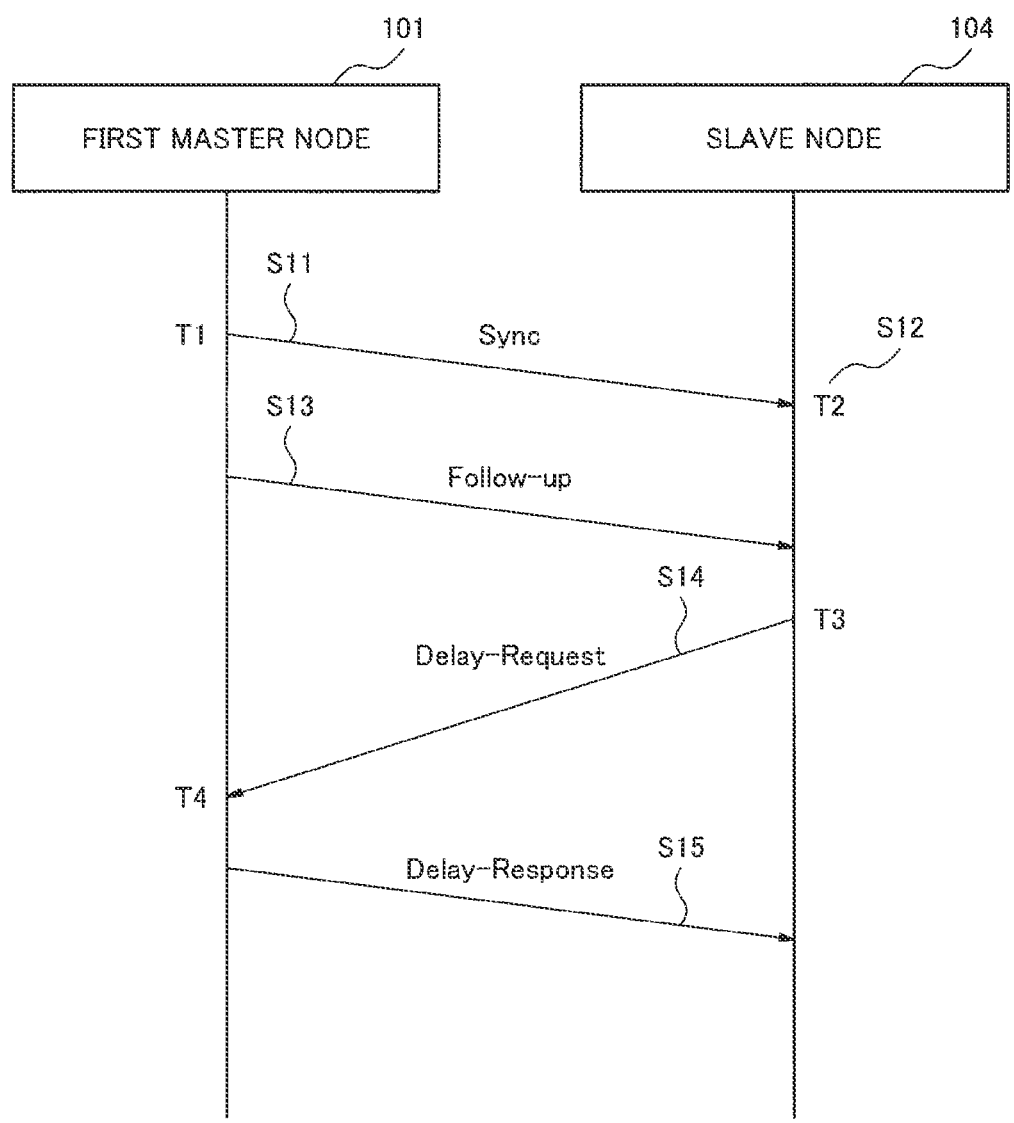
FIG. 5 is a diagram illustrating an operation of a protocol processing unit of the first exemplary embodiment.

First, the time regeneration units acquire time information from the master nodes (step S1). FIG. 5 illustrates an example of an operation using the protocol processing unit 203 between the first master node 101 and the slave node 104. In this description, an operation which conforms to the two-step operation of IEEE1588v2 will be described.

The master node 101 transmits a Sync message. At the transmission, the master node 101 records a transmission time T1 (step S11).

The slave node 104 receives the Sync message. At the reception, the slave node 104 records a time T2 (step S12).

The master node 101 transmits the time T1 as a Follow-up message (step S13).

The slave node 104 transmits a Delay-Request message to the master node 101 and records a transmission time T3 of the transmission (step S14).

The master node 101 records a time T4 at which the Delay-Request message is received and transmits the time T4 as a Delay-Response message to the slave node 104 (step S15).

The protocol processing unit 203 determines the time of the slave node by using these pieces of time information T1, T2, T3, and T4. A procedure of the determination will be described below.

When it is assumed that T2 and T3 denote times on the slave node, an offset in a difference of a time on the slave node from a time (absolute time) on the master node is denoted by a, T2' denotes an absolute time at which the slave node receives the Sync message, and T3' denotes an absolute time at which the slave node transmits the Delay-Request message, the times T2 and T3 are expressed by the following formulae (1) and (2).

$$T2 = T2' + a \tag{1}$$

$$T3 = T3' + a \tag{2}$$

When it is also assumed that a propagation delay between the master node 101 and the slave node 104 is denoted by D, T2' and T3' are expressed by the formulae (3) and (4).

$$T2' = T1 + D \tag{3}$$

$$T4 = T3' + D, \text{ i.e. } T3' = T4 - D \tag{4}$$

From the formulae (1), (2), (3), and (4), a is expressed by the following formulae.

$$a = T2 - T2' = T2 - (T1 + D) = T2 - T1 - D \tag{5}$$

$$a = T3 - T3' = T3 - (T4 - D) = T3 - T4 + D \tag{6}$$

From the formulae (5) and (6), $$a = T2 - T1 - D = T3 - T4 + D \tag{7}$$

When the formula (7) is deformed, $$2D = T2 - T1 - T3 + T4 = (T2 - T1) + (T4 - T3)$$

$$D = \{(T2 - T1) + (T4 - T3)\}/2 \tag{8}$$

The protocol processing unit 203 can, with the formula (8), compute the propagation delay D regardless of the time difference between the slave node 104 and the master node 101. The protocol processing unit 203 can also compute the time difference between the slave node and the master node based on the propagation delay D by using the formulae (1) and (2).

The protocol processing unit 203 outputs the propagation delay D and the offset a to the time correction unit 204. The time correction unit 204 generates a regenerated time by adding the offset a to the counter output from the counter unit 202.

Next, the time comparison unit 108 outputs differences of times input individually from a plurality of master nodes (step S2). In this processing, while the regenerated time indicates an accurate time in an ideal environment in which network delays are static and the delays are symmetric, a delay amount is not static and symmetry is not assured due to collisions of traffic or the like in an actual network. Therefore, the time comparison unit 108 compares each regenerated time, which is generated by each of the first time regeneration unit 105, the second time regeneration unit 106, and the third time regeneration unit 107, with the reference time generated by the frequency regeneration unit 111, and outputs the differences between the times as comparison results.

The statistic unit 110 carries out weighting for each comparison result output by the time comparison unit 108 (step S3). Specifically, the first correction unit 304, the second correction unit 305, and the third correction unit 306 carry out weighting for the comparison results output by the first comparison unit 301, the second comparison unit 302, and the third comparison unit 303, respectively. In this processing, weight is given so as to be inversely proportional to the propagation delay D but proportional to clock precision of a master node. The clock precision of a master node is communicated from the master node with Clock Quality by Announce Message based on IEEE1588v2.

When a difference between the times output by each of the comparison units 301, 302, and 303 is denoted by Td, the propagation delay is denoted by D, and the clock precision of a master node is denoted by Q, a correction value Tc which is used for the statistical processing by the statistical processing unit 307 is expressed by the following formula (9).

$$Tc = Td \times Q/D \quad (9)$$

In this processing, small propagation delay D indicates that the transmission distance between the master node and the slave node is short. The slave node 104 prioritizes time information from a master node located in a short distance and also prioritizes time information with high precision.

Figure 6:
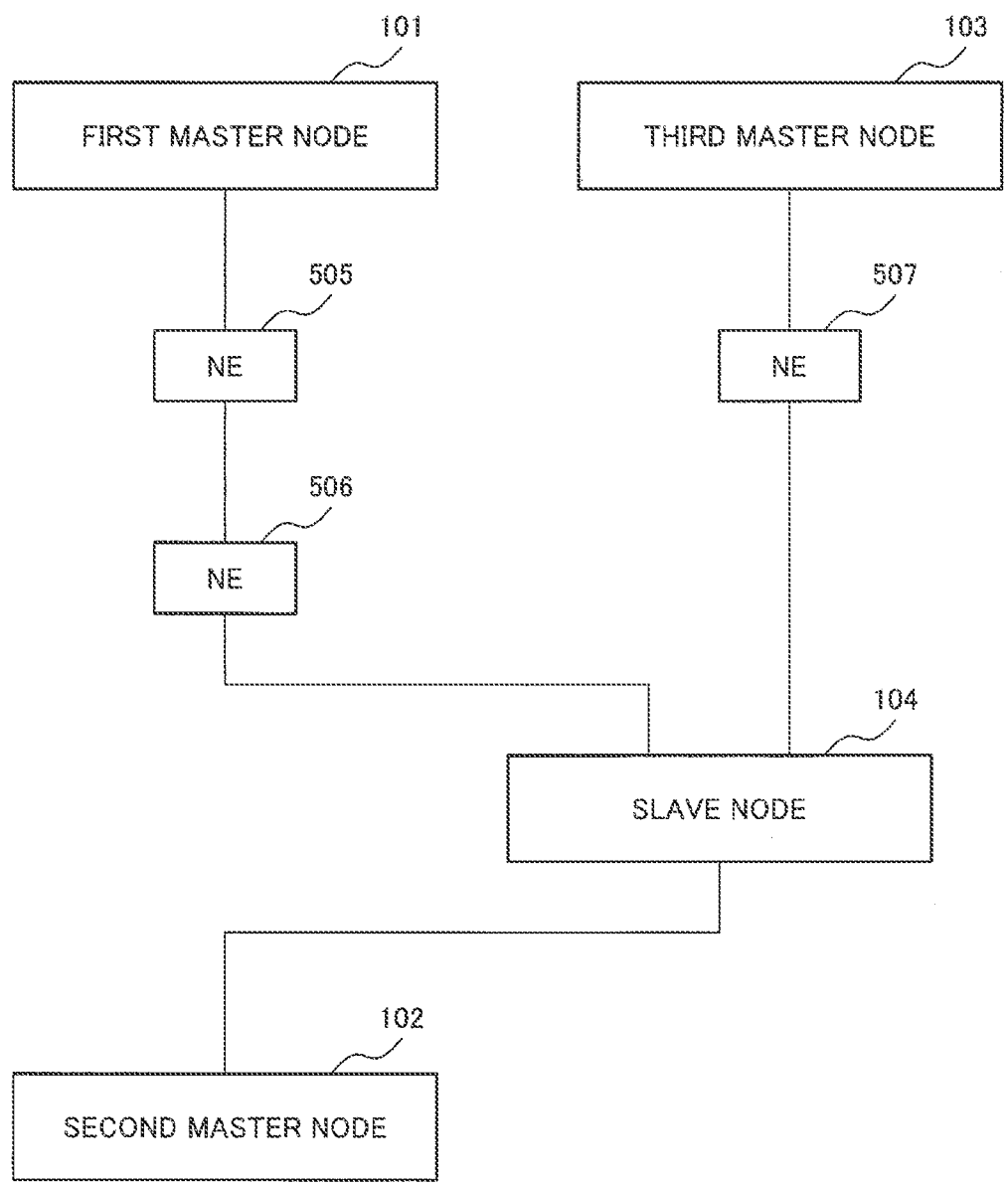
FIG. 6 is a schematic diagram of a network of the first exemplary embodiment.

FIG. 6 is a schematic diagram illustrating a network of the clock synchronization system 10. Referring to FIG. 6, the fact that, in the formula (9), the smaller the propagation delay D is, the shorter the transmission distance between the master node and the slave node is, will be described, and a reason for which the correction value Tc is determined so as to be inversely proportional to the propagation delay D will be described.

For example, it is assumed that between the master node 101 and the slave node 104, a first Network Element (NE: network device such as a switch and a router) 505 and a second NE 506 exist, and, in a similar manner, there is no NE between the master node 102 and the slave node 104, and there exists an NE 507 between the master node 103 and the slave node 104.

In the schematic diagram of FIG. 6, each of the master nodes, the slave node, and each of the NEs are connected by wire or wireless communication channels, and transmission time thereof is proportional to the transmission speed and transmission distance of, if a wire communication channel is used, an electrical signal or an optical signal and, if a wireless communication channel is used, a radio signal. Although the transmission time varies slightly depending on the condition of a transmission path, the transmission time hardly influences the fluctuation of an internode transmission delay.

The propagation delay D is mainly influenced by internal delays of an NE. This is because at minimum a delay equivalent to the duration of one frame is caused by a store-and-forward transmission method employed by a usual NE, and, depending on a communication condition of the network, buffering inside the NE further increases the delay. The length itself of the propagation delay D is dominantly influenced by the buffering, and thus a delay variation amount is correlated with a propagation delay.

Accordingly, the greater the delay variation amount is, the longer the propagation delay D tends to become. Therefore, in the formula (9), the correction value Tc is inversely proportional to the propagation delay D.

Next, the statistical processing unit 307 carries out statistical processing (step S4). Specifically, to the statistical processing unit 307, Tc1, Tc2, and Tc3, which correspond to the master nodes 101, 102, and 103, respectively, are input. The statistical processing unit 307 independently computes mean values and sample variances with respect to Tc1, Tc2, and Tc3 and computes median values based on the computed mean values and sample variances. As described above, the statistical processing unit 307, by estimating the time on the master node with which the slave node 104 should synchronize based on the regenerated times input from a plurality of master nodes, improves the precision and accuracy of the regenerated time. The statistical processing unit 307, based on the results of the statistical processing, determines a control voltage to the VCO 309 in the frequency regeneration unit 111 and outputs the determined voltage.

Lastly, the frequency regeneration unit 111, based on the statistical results computed by the statistical processing unit 307, computes the time on the slave node 104 (step S5). Specifically, the VCO 309 outputs a clock signal in accordance with the control voltage output by the statistical processing unit 307 based on the statistical results, and uses the frequency of the clock signal as the reference frequency. The reference time generation unit 310, based on the reference frequency, generates the reference time.

With this processing, by using signals from a plurality of synchronization sources independently, it is possible to improve the precision and accuracy of the time which is eventually acquired on the slave node.

In other words, on the slave node, by carrying out weighting individually for each regenerated time acquired from a plurality of master nodes and carrying out statistical processing independently to the weighted values, it is possible, even in an environment which has fluctuation and asymmetry in the network delay, to improve the precision and accuracy of the regenerated time. On the slave node, it is also possible to improve the precision of the regenerated frequency by improving the precision of the regenerated time. Moreover, on the slave node, it is possible to implement an independent time regeneration unit, time comparison unit, and time correction unit by software, and thus no increase in the hardware cost is caused.

The present invention is not limited to the above-described exemplary embodiment, and appropriate modifications can be made without departing from the scope of the invention. For example, although in the above description, a case in which three master nodes exist, and, based on times acquired from the three master nodes, the precision and accuracy of the time on a slave node are improved is described, the number of masters and slaves can be any number of N (N denotes an integer of 2 or more). Although the above description is based on the assumption that IEEE1588v2 is used as a protocol for time synchronization, it is possible to make the protocol processing unit in the time regeneration unit operate based on another time synchronization protocol. Although a case of two-step operation is described, even one-step operation does not produce any difference to the time regeneration operation. Although the time regeneration unit in the time regeneration unit is configured to carry out processing to correct a counter which operates in the reference frequency, the processing is not limited to this configuration and a configuration by which the time on the master node can be regenerated suffices. Although a case of using, as weight in the time correction unit, an inverse proportion to the propagation delay, which is computed by using Delay Request and Delay Response of the IEEE1588v2 protocol, is described, if an actual measurement of a network delay at each master node by an external measuring instrument or the like is possible, the measured value may be used. Although, in the formula (9), three values, specifically the time difference Td, the propagation delay D, and the clock precision Q of the master node, are used for the determination of the correction value Tc, the correction value Tc may be determined by using only the time difference Td and the propagation delay D. Moreover, for example, if the transmission distance between each master node and the slave node, or the like, is clarified in advance when the correction value Tc is determined, the transmission distance may be used in place of the propagation delay D. The communication quality Q may be determined manually in advance instead of being acquired through communication with the master node.

Although, in the above description of the exemplary embodiment, the present invention is assumed to be configured with hardware, the present invention is not limited to the configuration. It is also possible to implement any processing in the present invention by making a CPU (Central Processing Unit) execute computer programs. In this case, it is possible to provide the computer programs by recording the computer programs in a recording medium, and it is also possible to provide the computer programs by transmitting the computer programs via the Internet or other communication media. The recording media include, for example, a flexible disk, a hard disk, a magnetic disk, a magneto-optical disk, a CD-ROM, a DVD, a ROM cartridge, a RAM memory cartridge with battery backup, a flash memory cartridge, and a non-volatile RAM cartridge. The communication media include a wire communication medium such as a telephone line and a wireless communication medium such as a microwave line.

INDUSTRIAL APPLICABILITY

Use of the present invention on network equipment on which clock synchronization needs to be carried out, such as Long Term Evolution (LTE)-Time Division Duplex (TDD), is expected. Other than the network equipment, it is also possible to apply the present invention to all types of equipment, which carries out clock synchronization by using IEEE1588v2 or NTP and on which an improvement in the precision of clock synchronization is required. Moreover, an improvement in the precision of frequency is also achievable by the improvement in the precision of clock synchronization, and thus the present invention can be applied to fields where frequency synchronization with a high precision needs to be accomplished.

This application is based upon and claims the benefit of priority from Japanese patent application No. 2012-137859, filed on Jun. 19, 2012, the disclosure of which is incorporated herein in its entirety by reference.

REFERENCE SIGNS LIST

10 Clock synchronization system
101 First master node
102 Second master node
103 Third master node
104 Slave node
105 First time regeneration unit
106 Second time regeneration unit
107 Third time regeneration unit
108 Time comparison unit
109 Reference time determination unit
110 Statistic unit
111 Frequency regeneration unit
202 Counter unit
203 Protocol processing unit
204 Time correction unit
301 First comparison unit
302 Second comparison unit
303 Third comparison unit
304 First correction unit
305 Second correction unit
306 Third correction unit
307 Statistical processing unit
309 Reference frequency generation unit (VCO: Voltage Control Oscillator)
310 Reference time generation unit
505, 506, 507 Network Element (NE)

The invention claimed is:

1. A clock synchronization system which carries out synchronization of a time on a slave node based on time information received from a plurality of master nodes via a network, wherein the slave node comprises:
a memory storing instructions; and
a processor that, when executing the instructions, is configured to:
communicate with the master nodes, the number of which is N;
compute a propagation delay between each of the master nodes and the slave node;
regenerate a time of each of the master nodes;
compute a comparison result between the regenerated time of each of the master nodes, and a reference time held by the slave node; and
compute a correction value for each of the comparison results, by carrying out weighting for each respective comparison result of the comparison results based on the propagation delay computed for the master node associated with the respective comparison result; and
determine a corrected reference time of the slave node by using each of the correction values.

2. The clock synchronization system according to claim 1, wherein the processor, when executing the instructions, is further configured to:
carry out the weighting of each respective comparison result of the comparison results based on a clock precision acquired from the master node associated with the respective comparison result in addition to the propagation delay of the master node associated with the respective comparison result to compute the correction value for each of the comparison results; and
determine the reference time of the slave node by using each of the correction values.

3. The clock synchronization system according to claim 1, wherein, when executing the instructions, the processor is further configured to:
determine the reference time of the slave node based on each of the computed correction values; and
determine a reference frequency of the slave node.

4. The clock synchronization system according to claim 1, wherein, when executing the instructions, the processor is further configured to:
output the correction value which is computed by carrying out weighting for each of the computed comparison results; and
carry out statistical processing for each of the correction values;
output a result of the statistical processing;
generate a reference frequency based on the result of the statistical processing; and
generate, based on the reference frequency the corrected reference time of the slave node.

5. The clock synchronization system according to claim 1, wherein, when executing the instructions, the processor is further configured to:
- compute a mean value and a sample variance for each of the correction values independently;
- compute a median value based on the computed mean and the sample variance; and
- determine the corrected reference time of the slave node.

6. The clock synchronization system according to claim 1, wherein, when executing the instructions, the processor is further configured to:
- keep counting up at timings in accordance with the reference frequency;
- compute, based on a delay time in transmission and reception of a protocol, the propagation delay and a time difference between one of the master nodes and the slave node; and
- correct, based on the propagation delay and the computed time difference, a count.

7. The clock synchronization system according to claim 1, wherein, when executing the instructions, the processor is further configured to:
- carry out weighting for each of the respective comparison results based on a transmission distance between one of the master nodes and the slave node;
- compute each of the correction values; and
- determine the reference time of the slave node by carrying out statistical processing by using each of the correction values.

8. A clock synchronization method which carries out synchronization of a time on a slave node based on time information received from a plurality of master nodes via a network, the method comprising the steps of, executed by the slave node:
- regenerating a time of each of the master nodes;
- computing a comparison result between the regenerated time of each of the master nodes and a reference time held by the slave node;
- carrying out weighting for each respective comparison result of the comparison results based on a propagation delay between the master node associated with the respective comparison result and the slave node to compute correction values for each of the computed comparison results; and
- determining a corrected reference time of the slave node by using each of the correction values.

9. A non-transitory storage medium storing a clock synchronization program which carries out synchronization of a time on a slave node based on time information received from a plurality of master nodes via a network, wherein the program carries out the steps of:
- acquiring a regenerated time of each of the master nodes;
- acquiring a propagation delay between each of the master nodes and the slave node;
- computing a comparison result between the acquired regenerated time of each master node and a reference time held by the slave node;
- computing a correction value for each respective comparison result of the comparison results by carrying out weighting for each respective comparison result based on the propagation delay acquired for the master node associated with the respective comparison result; and
- determining a corrected reference time of the slave node by using each of the correction values.

10. The clock synchronization system according to claim 1, wherein the weighting for each respective comparison result of the comparison results is inversely proportional to the propagation delay computed for the master node associated with the respective comparison result.

11. The clock synchronization method according to claim 8, wherein the weighting for each respective comparison result of the comparison results is inversely proportional to the propagation delay computed for the master node associated with the respective comparison result.

12. The non-transitory storage medium according to claim 9, wherein the weighting for each respective comparison result of the comparison results is inversely proportional to the propagation delay computed for the master node associated with the respective comparison result.

13. The clock synchronization system according to claim 1, wherein the weighting for each respective comparison result of the comparison results is proportional to a clock precision of the master node associated with the respective comparison result.

14. The clock synchronization method according to claim 8, wherein the weighting for each respective comparison result of the comparison results is proportional to a clock precision of the master node associated with the respective comparison result.

15. The non-transitory storage medium according to claim 9, wherein the weighting for each respective comparison result of the comparison results is proportional to a clock precision of the master node associated with the respective comparison result.

* * * * *